UNITED STATES PATENT OFFICE 2,439,746

METHOD OF PREPARING MEPACRINE DIHYDROCHLORIDE DIHYDRATE

Arthur George Murray, Blackley, Manchester, England, assignor to Imperial Chemical Industries Limited, a corporation of Great Britain No Drawing. Application June 16, 1944, Serial No. 540,753. In Great Britain June 16, 1943

8 Claims. (Cl. 260—279)

This invention relates to improvements in the manufacture of mepacrine hydrochloride, more particularly in respect of the isolation of the product.

The mepacrine hydrochloride of the British Pharmacopoeia is the dihydrate of 2-methoxy-6 - chloro - 9 - (4'-diethylamino-1'-methylbutylamino)-acridine dihydrochloride. Some manufacturing processes yield the anhydrous dihydrochloride and others yield hydrated forms containing up to 2 molecular proportions of water, but all these forms are frequently termed mepacrine hydrochloride. Accordingly in this specification the term "mepacrine hydrochloride" is used for the dihydrochloride whether anhydrous or hydrated to any degree and the dihydrated dihydrochloride is termed "mepacrine hydrochloride" or "mepacrine hydrochloride B. P." Also, for convenience, the corresponding base, 2 - methoxy - 6 - chloro - 9 (4'-diethylamino-1'-methylbutylamino)-acridine is referred to as "mepacrine base."

The customary method of making mepacrine hydrochloride (see, for instance, Example 3 of British Patent No. 363,392) is to heat 2-methoxy-6:9-dichloroacridine and 2-amino-5-diethylaminopentane together in phenol. When the reaction is over the reaction mass is added to a mixture of aqueous caustic soda and ether, whereupon the phenol dissolves up in the aqueous phase and the mepacrine, in the form of the free base, passes into the ether. The ether layer is separated off and the mepacrine is extracted therefrom by shaking with dilute aqueous acetic acid. This acetic acid extraction effects a considerable separation of the mepacrine from accompanying less basic impurities, particularly 2-methoxy-6-chloro-9-phenoxy acridine, which largely remain behind in the ether. Then the mepacrine base is reprecipitated by addition of ammonia and again ether extracted. Finally it is converted to the hydrochloride by addition of an ether solution of hydrogen chloride. The hydrochloride separates out and is recrystallised from alcohol.

This process, or at least the method used for isolating the product, is not very suitable for use upon the large scale. It involves a large number of stages and requires the use of ether, which for obvious reasons, is preferably avoided in technical operations. In fact, in commercial use of the process, benzene is frequently substituted for the ether. Nevertheless, the process still involves a large number of stages, with progressive diminution in yield, the separation from impurities, particularly any unreacted 2-amino-5-diethylaminopentane, is not so complete as is desirable and finally the product is frequently not mepacrine hydrochloride B. P., i. e., the dihydrate, but the anhydrous dihydrochloride. To convert this into mepacrine hydrochloride B. P. requires a subsequent separate operation.

In seeking to improve the isolation of mepacrine hydrochloride we have found that a particularly convenient procedure is to follow that described above as far as the acetic acid extraction, but thereafter to proceed by precipitating the product directly by addition of hydrogen chloride, conveniently in the form of concentrated hydrochloric acid. We have also found that instead of acetic acid, formic acid may be used with equal success, especially if instead of each molecular proportion of acetic acid there is used about three-quarters of a molecular proportion of formic acid. By working in this way the reprecipitation of the mepacrine base by ammonia and its resolution in ether can be dispensed with, with a gain in yield and no deleterious effect on the quality of the product, and, moreover, the precipitate formed on addition of the hydrochloric acid to the aqueous mepacrine acetate or formate solution is the dihydrated dihydrochloride, so that the need for a final hydration step is eliminated.

The present invention, therefore, provides an improvement in the process of manufacture of mepacrine hydrochloride (i. e., the dihydrate of 2 - methoxy - 6 - chloro - 9 - (4'-diethylamino-1'-methylbutylamino)-acridine dihydrochloride) which comprises adding hydrogen chloride to a solution of mepacrine base in aqueous acetic or formic acid, whereby mepacrine hydrochloride is precipitated.

As compared with the customary process the new isolation procedure involves fewer steps, with a consequent increase in ease of operation and in yield; it gives mepacrine hydrochloride B. P. immediately, without the need for a special hydration step; and it is much more tolerant to the use of somewhat impure intermediates. Thus, for instance, if a dark coloured commercial quality of 2-methoxy-6:9-dichloroacridine is used, the acetic acid solution of mepacrine base obtained therefrom is also dark coloured and contains tarry impurities which are difficult to remove. The process of Specification 363,392 endeavours to remove these by reprecipitating the base with ammonia and again extracting with ether. In practice, it is found, however, that even when in addition to this the acetate extract is treated with decolourising charcoal, the quality of the eventual mepacrine hydrochloride is not all that could be desired. With the process of this invention, on the other hand, using the same quality of intermediates it is possible to obtain very high quality mepacrine hydrochloride by simply charcoal treating the acetate extract and then precipitating the hydrochloride direct by addition of concentrated hydrochloric acid. Moreover, for a process consisting in precipitating from aqueous solution a readily water-soluble compound, the yield is surprisingly high. Actually under the preferred conditions now to be described 97–98% of the mepacrine present in the acetate extract is precipitated in this one simple operation.

In a preferred embodiment of the invention the conditions of the precipitation are carefully controlled so that the mepacrine hydrochloride separates out in a particularly readily filtrable form.

The best physical form is obtained by using a solution of mepacrine acetate (or formate) containing an excess of acetic (or formic) acid at 25° C. and rapidly adding concentrated hydrochloric acid (the ordinary 35% aqueous solution is convenient). The concentrations of mepacrine, acetic acid and hydrogen chloride in the final liquor from which the precipitation takes place are important, suitable proportions of mepacrine (calculated as base), of acetic acid and of free hydrochloric acid being respectively 5–20%, 10–20% and 2.5–10% weight for weight, calculated on the weight of the total liquor. (If formic acid is used instead of acetic, the weight should be halved, so as to give about three-quarters of the quantity of acetic acid on an equivalent weight basis.) If these conditions are achieved, the hydrochloric acid being rapidly added to the slowly stirred mepacrine acetate (or formate) solution at 25° C., then the mepacrine hydrochloride is precipitated in a physical form in which it is very easily filtered off, washed with acetone to remove aqueous acidic mother liquors and dried. Other isolation procedures involving precipitation or crystallisation from aqueous media meet difficulties in slow filtration and obstinate retention by the filter cake of water and free hydrochloric acid, which gives trouble in the subsequent drying operation, so that repeated washing with large amounts of acetone is needed. With the preferred form of the present process, the filtration and washing are easy and the acetone consumption relatively small, with a resultant simplification of operation and diminution in cost.

The present process may be advantageously combined with that of co-pending application of W. A. Cowdrey and myself, Serial No. 541,462, now Patent No. 2,410,406.

The following examples illustrate, but do not limit the invention.

*Example 1*

55.6 lbs. of 2-methoxy-6:9-dichloroacridine and 33.2 lbs. of 2-amino-5-diethylaminopentane are caused to interact together in 120 lbs. of phenol in the manner described in Example 2 of co-pending application Ser. No. 541,462, now Patent No. 2,410,406. The reaction mass is then added to a mixture of 550 lbs. of benzene and 600 lbs. of aqueous 15% caustic soda solution. The benzene solution is separated off and washed several times with water. It is then extracted with 320 lbs. of aqueous 20% acetic acid (using three extractions with, respectively, 200, 60 and 60 lbs.) whereupon the mepacrine base passes into the aqueous liquor. The layers are separated and the benzene layer discarded. A further 64 lbs. of acetic acid (glacial) and 5 lbs. of decolourising charcoal are added to the aqueous layer which is stirred for 1 hour and filtered. Water is then added to the filtrate to bring the total volume to 64 gallons. This aqueous acetic acid solution of mepacrine acetate is then stirred gently at 25° C. and 105 lbs. of concentrated hydrochloric acid (35%) are added within 10 seconds. During this addition the temperature rises to 30° C. After stirring gently for a few minutes until the separation of the mepacrine hydrochloride is substantially complete the mixture is cooled to 20° C. in about 1 hour and the product is then filtered off, washed with acetone to remove residual acidic aqueous mother liquors and dried. The yield is 94 lbs. of high quality mepacrine hydrochloride.

*Example 2*

The washed benzene solution of mepacrine base obtained as described in Example 1 above is extracted with 320 lbs. of aqueous 15% formic acid (using three extractions with, respectively, 200, 60 and 60 lbs.). To the combined extracts a further 24 lbs. of formic acid and 5 lbs. of decolourising charcoal are added and, after stirring for 1 hour the mixture is filtered and the filtrate made up to 64 gallons by addition of water.

The mepacrine hydrochloride is then precipitated by addition of 105 lbs. of concentrated hydrochloric acid, in the manner described in Example 1. The yield is 94 lbs.

Whereas the above examples illustrate several embodiments of our invention, it will be apparent to one skilled in the art that many other variations or modifications can be devised without departing from the spirit and scope thereof and accordingly it is to be understood that the invention is not in any way limited thereby, but only as defined in the following claims.

I claim:

1. The improvement in the process of manufacture of mepacrine-dihydrochloride-dihydrate (i. e., the dihydrate of 2-methoxy-6-chloro-9-(4' - diethylamino - 1' - methyl - butylamino) - acridine dihydrochloride) which comprises adding hydrogen chloride to a solution of mepacrine base in aqueous organic acid selected from the group consisting of acetic and formic acids, whereby mepacrine-dihydrochloride-dihydrate is precipitated.

2. In the process of preparing mepacrine-dihydrochloride dihydrate, the step which consists of adding aqueous hydrochloric acid to a solution of mepacrine base in an aqueous solution of an organic acid selected from the group consisting of acetic and formic acids, and recovering the precipitated mepacrine-dihydrochloride dihydrate.

3. Process as claimed in claim 2 wherein the organic acid employed is acetic acid, and wherein the quantities of the various substances used are so adjusted that the concentrations of the components in the final liquor from which the precipitation takes place are: mepacrine (calculated as base) 5–20%, free hydrochloric acid 2.5–10%, acetic acid 10–20%, all these percentages being weight for weight and calculated on the weight of the total liquor, and wherein the hydrochloric acid is rapidly added to the slowly stirred solution of mepacrine in the aforementioned aqueous organic acid at about 25° C.

4. A process as in claim 2, wherein the hydrochloric acid is employed in sufficient quantity to give in the aqueous mass an initial concentration of not more than 10% HCl by weight.

5. A process as in claim 2, wherein the aqueous solution of organic acid is adjusted initially to a concentration of not more than 20% of organic acid by weight, and wherein the quantity of hydrochloric acid employed is calculated to give an initial concentration in the aqueous mass of between 2.5 and 10% of HCl by weight.

6. A process for producing the dihydrate of 2-methoxy - 6 - chloro-9 - (4' - diethylamino - 1' - methyl - butylamino) - acridine dihydrochloride, which comprises reacting 2-methoxy-6:9-dichloro-acridine with 2-amino-5-diethylamino-pentane in a medium of phenol, adding the reaction mass to a mixture of aqueous caustic soda and an organic solvent selected from the group consisting of ether and benzene, separating the oily phase and treating the same with an aqueous solution of an aliphatic carboxylic acid selected from the group consisting of acetic and formic acids, then treating said aqueous mass with aqueous hydrochloric acid to precipitate the dihydrochloride dihydrate above named, and separating the precipitate from the aqueous mass.

7. Process as claimed in claim 2, wherein the organic acid employed is formic acid and the quantities of the various substances used are so adjusted that the concentrations of the components in the final liquor from which the precipitation takes place are: mepacrine (calculated as base) 5–20%, free hydrochloric acid 2.5–10%, formic acid 5–10%, all of these percentages being weight for weight and calculated on the weight of the total liquor, and wherein the hydrochloric acid is rapidly added to the slowly stirred solution of mepacrine in the aforementioned aqueous organic acid at about 25° C.

8. A process as in claim 6, wherein the aqueous mass after treatment with said aliphatic carboxylic acid is stirred up with decolorizing charcoal and filtered, prior to further treatment with aqueous hydrochloric acid.

ARTHUR GEORGE MURRAY.

REFERENCES CITED

The following references are of record in the file of this patent:

UNITED STATES PATENTS

| Number | Name | Date |
|---|---|---|
| 2,077,249 | Mietzsch et al. | Apr. 13, 1927 |
| 2,121,207 | Mietzsch et al. | June 21, 1938 |

OTHER REFERENCES

Braz, cited in Chem. Abstracts, 1942, pages 4122 and 4123.